W. A. BARLOW.
Culinary Vessels.

No. 145,550.

Patented Dec. 16, 1873.

WITNESSES.
John H. Lawlor
F. F. Warner

INVENTOR.
William A. Barlow

UNITED STATES PATENT OFFICE.

WILLIAM A. BARLOW, OF CHICAGO, ILLINOIS.

IMPROVEMENT IN CULINARY VESSELS.

Specification forming part of Letters Patent No. 145,550, dated December 16, 1873; application filed May 19, 1873.

*To all whom it may concern:*

Be it known that I, WILLIAM A. BARLOW, of Chicago, in the county of Cook and State of Illinois, have invented certain new and useful Improvements in Culinary Vessels, of which the following is a full, clear, and exact description, which will enable others skilled in the art to which my invention appertains to make and use the same, reference being had to the accompanying drawings forming a part of this specification, and in which—

Figure 1:
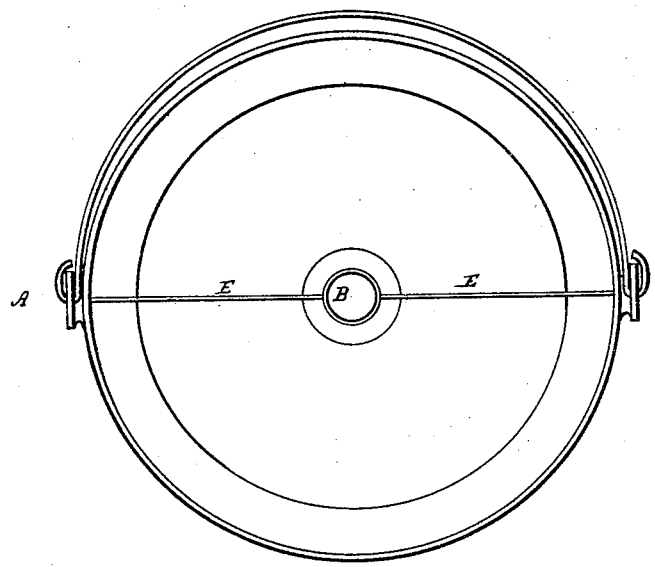
Figure 2:
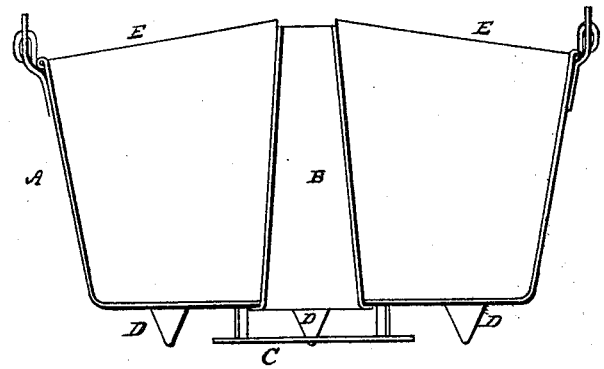

Figure 1 is a top or plan view of my improved culinary vessel when the cover is removed, and Fig. 2 a vertical central section thereof.

Like letters of reference indicate like parts.

My invention relates to that class of culinary vessels which are provided with flues for the purpose of conducting into the stove the steam generated within the vessel. It consists in arranging a spreader or diffuser below the lower mouth of the flue, so that the steam in escaping will be spread over the bottom of the vessel and diffused as it enters the stove, thus utilizing the heat of the steam and preventing the fire from being deadened by the induction of the steam into the stove.

In the drawing, A represents a vessel of the class referred to. B is a flue, the upper end of which communicates with the interior of the vessel. The lower end of the flue is arranged to communicate with the interior of the stove. C is a spreader or diffuser, arranged below the lower mouth of the flue. D D are legs, for the purpose of supporting the vessel above the stove, when the former is placed upon, instead of into, the stove, so that the steam may then escape through the flue, and also for the purpose of protecting the spreader or diffuser. E E are partitions, constructed and arranged to divide the vessel into separate compartments.

It will be perceived from the foregoing description that the steam, when an ordinarily tight cover is employed, will be diffused across the bottom of the vessel, and prevented from being ejected directly upon the fire. It will also be perceived that the vessel may also be filled with water only and arranged over the fuel in the stove. The escaping steam will then become superheated by reason of its impingement against the heated spreader, and aid in consuming the products of combustion.

Having thus described the nature and object of my invention, what I claim as new, and desire to secure by Letters Patent, is—

A culinary vessel provided with a steam-flue, terminating vertically in the bottom of the vessel, when the said vessel is provided with the disk C arranged horizontally beneath the lower mouth of the said flue, substantially as shown and described, for the purpose of spreading the steam in all directions across the bottom of the vessel and preventing the fire from being deadened by a downward jet, and for the purposes specified.

WILLIAM A. BARLOW.

Witnesses:
N. C. GRIDLEY,
F. F. WARNER.